United States Patent Office 2,706,734
Patented Apr. 19, 1955

2,706,734

PRODUCTION OF SULPHUR-CONTAINING ORGANIC COMPOUNDS

Andrew McLean, Sunbury-on-Thames, and Vincent Ernest Gripp, Iver, England, assignors to The British Petroleum Company Limited No Drawing. Application December 16, 1953, Serial No. 398,638

Claims priority, application Great Britain December 31, 1952

19 Claims. (Cl. 260—456)

This invention relates to a process for the production of sulphur-containing organic compounds.

It is an object of this invention to provide a process for the production of new and useful sulphur containing organic compounds. It is a further object to provide a process for the production of new materials suitable for use as extreme pressure additives for incorporation in lubricating oils.

According to the present invention, new and useful compounds are produced by a process which comprises reacting a hydrocarbon hydroperoxide with sulphur mono-chloride.

If desired, mixtures comprising a plurality of hydrocarbon hydroperoxides may be employed. Preferred hydroperoxide containing materials for use in the process of the invention are the oxidates obtained by the partial aerial oxidation of hydrocarbons, for example normal paraffins or hydrocarbon mixtures comprising saturated hydrocarbons, for example petroleum distillation fractions. A particularly preferred paraffin for oxidation is normal cetane. A preferred petroleum distillate fraction is kerosine. Suitably the kerosine fraction has an initial boiling point above 160° C. and a final boiling point below 270° C.

If desired an extract obtained by solvent extraction of an oxidate, as described above, may be employed in the reaction with sulphur monochloride. Suitable solvents for this purpose are lower monohydric alcohols, particularly methanol. Other preferred hydroperoxide-containing materials are the reaction products of alcohols with hydrogen peroxide. Suitable alcohols include naphthenic alcohols. Other suitable hydroperoxides are obtained by reacting Grignard reagents with oxygen and reacting the products with water.

Preferably the reaction with sulphur monochloride is carried out in the presence of a hydrocarbon diluent, a suitable diluent being benzene. Preferably the reaction is carried out in the temperature range minus 50 to +50° C.

It is believed that the products obtained according to the process hereinbefore described are novel compounds of the general formula RO—SO—SO—OR, where R is a hydrocarbon group. Thus according to a further aspect of the present invention there is claimed the novel compounds herein described. Particularly useful novel compounds are the compounds having the general formula RO—SO—SO—OR where R is a hydrocarbon group of 5–30 carbon atoms and, preferably, is a straight chain alkyl group of 12–18 carbon atoms.

It has been found that the main reaction products obtained by the process of the invention, when using a hydrocarbon hydroperoxide of 5 to 30 carbon atoms per molecule, have useful properties as extreme pressure additives for lubricating oils, such as, for example, gear oils, wire drawing oils and hydraulic oils. It has also been found that in general the products formed from tertiary hydrocarbon hydroperoxides are particularly suitable materials for these applications.

Thus according to a further aspect of the present invention there is provided novel lubricating compositions comprising a lubricating oil and a sulphur containing organic compound of general formula

RO—SO—SO—OR wherever produced by a process as hereinbefore described.

The invention is illustrated but in no way limited by the following examples.

*Example 1*

A sulphuric acid washed kerosine fraction of boiling range 220–230° C. was oxidised with air at 140° C., the oxidation being continued until the oxidate had a hydroperoxide content of 6 per cent by weight. The oxidate was extracted with methanol and the methanol removed from the extract by distillation, leaving as residue a hydroperoxide concentrate containing 24 per cent by weight of hydroperoxide (as $C_{13}H_{27}OOH$). 82 grams of this concentrate were dissolved in dried benzene, chilled to 5° C. and a solution of 6.5 grams of sulphur monochloride (mole $S_2Cl_2$ for 2 moles peroxide) added during 1 hour. Hydrogen chloride was evolved towards the end of this time. The reaction mixture was left at 5° C. for a further 2.5 hours and then allowed to warm to room temperature, when darkening occurred. The product was washed with water and with aqueous sodium bicarbonate and dried with anhydrous sodium sulphate. Benzene was then distilled off under vacuum, the distillation being continued to a base temperature of 146° C. at a pressure of 0.2 mm. of mercury.

*Example 2*

A n-cetane hydroperoxide concentrate (containing 60 per cent by weight of hydroperoxide) was prepared by air oxidation of n-cetane. 50 grams of this concentrate was dissolved in 150 mls. of benzene. To this was added 7.8 grams of sulphur monochloride under the conditions of Example 1, the final product (48 grams) being isolated by the procedure described in said example.

*Example 3*

40 grams of 1-methyl-1-hydroxy cyclohexane was reacted with hydrogen peroxide to give a product containing 36 per cent by weight of the corresponding hydroperoxide. This peroxide concentrate was dissolved in 100 ml. of benzene and stirred at 23° C. 7 grams of sulphur monochloride, dissolved in 50 ml. of benzene, was then added during 1 hour and the mixture left for a further 3 hours. 32 grams of the reaction product was then isolated in the manner described in Example 1.

*Example 4*

The products made as described in Examples 1–3 were tested in a 4-ball machine in blend with a transmission oil sold under the trade name "Energol 300" (Energol is a registered trade-mark). The results, compared with those for the base oil and for the same base oil together with a commercial extreme pressure (E. P.) additive are shown in the following table, which shows the mean diameter in mm. of the wear spot under various loading conditions.

| Load applied for 1 minute, Kg. | Base Oil | Commercial E. P. additive | Kerosene reaction product | n-cetane reaction product | methyl-cyclo-hexanol reaction product |
|---|---|---|---|---|---|
| 100 | 2.53 | 0.48 | 0.56 | 0.64 | 0.59 |
| 140 | Welded | | | | |
| 240 | | 1.88 | | 1.77 | |
| 280 | | 2.17 | | 1.85 | |
| 300 | | 2.3 | 1.98 | Welded | 1.32 |
| 330 | | Welded | | | |
| 340 | | | | | 1.605 |
| 360 | | | | | Welded |

We claim:

1. A process for the production of new sulphur-containing compounds which comprises reacting a hydrocarbon hydroperoxide with sulphur monochloride.

2. A process as specified in claim 1 in which the hydrocarbon hydroperoxide contains 5–30 carbon atoms per molecule.

3. A process as specified in claim 2 in which the hydrocarbon hydroperoxide contains, in the molecule, the group—OOH attached to a carbon atom which is attached to three carbon atoms.

4. A process as specified in claim 1 in which the hydrocarbon hydroperoxide contains, in the molecule, the group—OOH attached to a carbon atom which is attached to three carbon atoms.

5. A process as specified in claim 1 in which the hydrocarbon hydroperoxide is a hydroperoxide which has been formed by the partial aerial oxidation of a hydrocarbon.

6. A process as specified in claim 1 in which the hydrocarbon peroxide is the hydroperoxide of a normal paraffin having 12 to 18 carbon atoms per molecule.

7. A process as specified in claim 5 in which the paraffin is cetane.

8. A process as specified in claim 1 in which a mixture of hydrocarbon hydroperoxides is employed, said hydroperoxides having been formed by the partial oxidation of a petroleum distillate fraction.

9. A process as specified in claim 8 in which the petroleum distillate fraction is a kerosine fraction.

10. A process as specified in claim 9 in which the kerosine fraction has an initial boiling point above 160° C. and a final boiling point below 270° C.

11. A process as specified in claim 1 in which the hydroperoxide is contained in the extract obtained by the solvent extraction of an oxidate obtained by the partial aerial oxidation of a hydrocarbon.

12. A process as specified in claim 1 in which the hydrocarbon hydroperoxide is the product obtained by reacting an alcohol with hydrogen peroxide.

13. A process as specified in claim 12 in which the alcohol is a naphthenic alcohol.

14. A process as specified in claim 1 in which the hydrocarbon hydroperoxide is a compound obtained by reacting a Grignard reagent with oxygen and thereafter reacting the product with water.

15. A process as specified in claim 1 in which the hydrocarbon hydroperoxide is reacted with sulphur monochloride in the presence of a hydrocarbon diluent.

16. A process as specified in claim 1 in which the hydrocarbon hydroperoxide is reacted with sulphur monochloride at a temperature in the range minus 50° C. to 0° C.

17. Novel sulphur compounds having the general formula RO—SO—SO—OR, where R is a straight chain alkyl group of 12–18 carbon atoms.

18. A novel sulphur compound having the formula RO—SO—SO—OR, where R is the cetyl group.

19. A novel sulphur compound having the formula RO—SO—SO—OR, where R is the 1-methyl cyclohexanyl group.

References Cited in the file of this patent

UNITED STATES PATENTS

| | | |
|---|---|---|
| 2,422,243 | Knutson et al. | June 17, 1947 |
| 2,486,373 | Blumer | Nov. 1, 1949 |